US012567651B2

(12) United States Patent
Avison et al.

(10) Patent No.: US 12,567,651 B2
(45) Date of Patent: Mar. 3, 2026

(54) NANOPOROUS COMPOSITE SEPARATORS WITH INCREASED THERMAL CONDUCTIVITY

(71) Applicant: 24M Technologies, Inc., Cambridge, MA (US)

(72) Inventors: David W. Avison, Townsend, MA (US); Shreyans Shingi, Lowell, MA (US); Chandrakant C. Patel, Burlington, MA (US); Charles R. Comeau, Jr., Groton, MA (US); Samuel Lim, Lynn, MA (US)

(73) Assignee: 24M Technologies, Inc., Cambridge, MA (US)

( * ) Notice: Subject to any disclaimer, the term of this patent is extended or adjusted under 35 U.S.C. 154(b) by 713 days.

(21) Appl. No.: 17/861,535

(22) Filed: Jul. 11, 2022

(65) Prior Publication Data

US 2022/0352598 A1     Nov. 3, 2022

Related U.S. Application Data

(63) Continuation of application No. 17/563,430, filed on Dec. 28, 2021, now Pat. No. 11,387,521, which is a
(Continued)

(51) Int. Cl.
*H01M 50/446*     (2021.01)
*B29C 41/00*     (2006.01)
(Continued)

(52) U.S. Cl.
CPC ......... *H01M 50/446* (2021.01); *B29C 41/003* (2013.01); *B29C 41/02* (2013.01);
(Continued)

(58) Field of Classification Search
CPC .................................................. H01M 50/446
See application file for complete search history.

(56) References Cited

U.S. PATENT DOCUMENTS 3,625,771 A     12/1971   Arrance et al.
3,647,554 A      3/1972   Arrance et al.
(Continued)

FOREIGN PATENT DOCUMENTS

CA         2605874 A1     1/2007
CA         2886154 A1     4/2014
(Continued)

OTHER PUBLICATIONS

Yang et al., "Analysis of Influence Factor of Polymer Thermal Conductivity," China Plastics Industry, vol. 33, Issue 10, 2005, pp. 1-4, (with English language translation of relevant portions).
(Continued)

*Primary Examiner* — Nathanael T Zemui

(57)     ABSTRACT

Nanoporous composite separators are disclosed for use in batteries and capacitors comprising a nanoporous inorganic material and an organic polymer material. The inorganic material may comprise $Al_2O_3$, AlO(OH) or boehmite, AlN, BN, SiN, ZnO, $ZrO_2$, $SiO_2$, or combinations thereof. The nanoporous composite separator may have a porosity of between 35-50%. The average pore size of the nanoporous composite separator may be between 10-90 nm. The separator may be formed by coating a substrate with a dispersion including the inorganic material, organic material, and a solvent. Once dried, the coating may be removed from the substrate, thus forming the nanoporous composite separator. A nanoporous composite separator may provide increased thermal conductivity and dimensional stability at temperatures above 200° C. compared to polyolefin separators.

18 Claims, 9 Drawing Sheets

Related U.S. Application Data continuation of application No. 16/927,435, filed on Jul. 13, 2020, now Pat. No. 11,217,859, which is a continuation of application No. 14/787,426, filed as application No. PCT/US2014/035947 on Apr. 29, 2014, now Pat. No. 10,879,513.

(60) Provisional application No. 61/817,119, filed on Apr. 29, 2013.

(51) Int. Cl.

| | |
|---|---|
| *B29C 41/02* | (2006.01) |
| *B29C 71/02* | (2006.01) |
| *C08J 5/22* | (2006.01) |
| *C08K 3/00* | (2018.01) |
| *C09K 5/08* | (2006.01) |
| *H01M 10/0525* | (2010.01) |
| *H01M 50/403* | (2021.01) |
| *B29K 23/00* | (2006.01) |
| *B29K 105/20* | (2006.01) |
| *B29K 709/02* | (2006.01) |
| *B29L 31/34* | (2006.01) |

(52) U.S. Cl.
CPC ................. *B29C 71/02* (2013.01); *C08J 5/22* (2013.01); *C08K 3/00* (2013.01); *C09K 5/08* (2013.01); *H01M 10/0525* (2013.01); *H01M 50/403* (2021.01); *B29K 2023/00* (2013.01); *B29K 2105/20* (2013.01); *B29K 2709/02* (2013.01); *B29K 2715/003* (2013.01); *B29L 2031/3468* (2013.01); *Y02T 10/70* (2013.01)

(56) References Cited

U.S. PATENT DOCUMENTS

| | | | |
|---|---|---|---|
| 3,703,413 | A | 11/1972 | Arrance |
| 4,338,177 | A | 7/1982 | Withers et al. |
| 4,342,637 | A | 8/1982 | Withers et al. |
| 4,670,110 | A | 6/1987 | Withers et al. |
| 4,711,719 | A | 12/1987 | Leenaars et al. |
| 4,826,743 | A | 5/1989 | Nazri |
| 4,916,033 | A | 4/1990 | Gourdine |
| 5,162,175 | A | 11/1992 | Visco et al. |
| 5,194,341 | A | 3/1993 | Bagley et al. |
| 5,314,765 | A | 5/1994 | Bates |
| 5,326,391 | A | 7/1994 | Anderson et al. |
| 5,340,669 | A | 8/1994 | Chaloner-Gill et al. |
| 5,350,645 | A | 9/1994 | Lake et al. |
| 5,415,954 | A | 5/1995 | Gauthier et al. |
| 5,418,091 | A | 5/1995 | Gozdz et al. |
| 5,439,760 | A | 8/1995 | Howard et al. |
| 5,549,717 | A | 8/1996 | Takeuchi et al. |
| 5,569,520 | A | 10/1996 | Bates |
| 5,597,659 | A | 1/1997 | Morigaki et al. |
| 5,691,005 | A | 11/1997 | Morigaki et al. |
| 5,731,104 | A | 3/1998 | Ventura et al. |
| 5,778,515 | A | 7/1998 | Menon |
| 5,824,434 | A | 10/1998 | Kawakami et al. |
| 5,840,087 | A | 11/1998 | Gozdz et al. |
| 5,882,721 | A | 3/1999 | Delnick |
| 5,888,431 | A | 3/1999 | Tonar et al. |
| 5,894,656 | A | 4/1999 | Menon et al. |
| 5,948,464 | A | 9/1999 | Delnick |
| 5,983,488 | A | 11/1999 | Erickson et al. |
| 6,002,239 | A | 12/1999 | Maloizel |
| 6,148,503 | A | 11/2000 | Delnick et al. |
| 6,153,337 | A | 11/2000 | Carlson et al. |
| 6,156,190 | A | 12/2000 | Xia et al. |
| 6,162,563 | A | 12/2000 | Miura et al. |
| 6,172,795 | B1 | 1/2001 | Carlson |
| 6,183,901 | B1 | 2/2001 | Ying et al. |
| 6,190,426 | B1 | 2/2001 | Thibault |
| 6,194,098 | B1 | 2/2001 | Ying et al. |
| 6,210,831 | B1 | 4/2001 | Gorkovenko et al. |
| 6,224,846 | B1 | 5/2001 | Hurlburt et al. |
| 6,268,087 | B1 | 7/2001 | Kim et al. |
| 6,277,514 | B1 | 8/2001 | Ying et al. |
| 6,277,981 | B1 | 8/2001 | Tu et al. |
| 6,287,720 | B1 | 9/2001 | Yamashita et al. |
| 6,306,545 | B1 | 10/2001 | Carlson et al. |
| 6,328,770 | B1 | 12/2001 | Gozdz |
| 6,344,293 | B1 | 2/2002 | Geronov |
| 6,358,397 | B1 | 3/2002 | Lyublinski |
| 6,387,564 | B1 | 5/2002 | Yamashita et al. |
| 6,406,814 | B1 | 6/2002 | Gorkovenko et al. |
| 6,410,182 | B1 | 6/2002 | Ying et al. |
| 6,423,444 | B1 | 7/2002 | Ying et al. |
| 6,423,447 | B1 | 7/2002 | Ohsaki et al. |
| 6,432,586 | B1 | 8/2002 | Zhang |
| 6,436,583 | B1 | 8/2002 | Mikhaylik |
| 6,444,344 | B1 | 9/2002 | Saito et al. |
| 6,451,484 | B1 | 9/2002 | Han et al. |
| 6,488,721 | B1 | 12/2002 | Carlson |
| 6,495,292 | B1 | 12/2002 | Yen |
| 6,497,780 | B1 | 12/2002 | Carlson |
| 6,589,692 | B2 | 7/2003 | Takami |
| 6,679,926 | B1 | 1/2004 | Kajiura |
| 6,682,856 | B1 | 1/2004 | Watanabe et al. |
| 6,723,467 | B2 | 4/2004 | Yoshida et al. |
| 6,724,512 | B2 | 4/2004 | Carlson et al. |
| 6,811,928 | B2 | 11/2004 | Aihara et al. |
| 6,846,435 | B1 | 1/2005 | Bohnen et al. |
| 6,883,347 | B2 | 4/2005 | Ayub |
| 6,946,218 | B2 | 9/2005 | Crouch, Jr. et al. |
| 6,962,182 | B2 | 11/2005 | Cordonnier et al. |
| 6,991,874 | B1 | 1/2006 | Möhwald et al. |
| 7,014,948 | B2 | 3/2006 | Lee et al. |
| 7,029,796 | B2 | 4/2006 | Choi et al. |
| 7,066,971 | B1 | 6/2006 | Carlson |
| 7,070,632 | B1 | 7/2006 | Visco et al. |
| 7,081,142 | B1 | 7/2006 | Carlson |
| 7,115,339 | B2 | 10/2006 | Nakajima et al. |
| 7,135,250 | B2 | 11/2006 | Sasaki et al. |
| 7,160,603 | B2 | 1/2007 | Carlson |
| 7,378,185 | B2 | 5/2008 | Fujikawa et al. |
| 7,396,612 | B2 | 7/2008 | Ohata et al. |
| 7,402,184 | B2 | 7/2008 | Kuta et al. |
| 7,419,743 | B2 | 9/2008 | Fujikawa et al. |
| 7,422,825 | B2 | 9/2008 | Inoue et al. |
| 7,470,488 | B2 | 12/2008 | Lee et al. |
| 7,560,193 | B2 | 7/2009 | Kuta et al. |
| 7,575,606 | B2 | 8/2009 | Fukumoto et al. |
| 7,595,130 | B2 | 9/2009 | Kawabata et al. |
| 7,638,230 | B2 | 12/2009 | Fujita et al. |
| 7,638,241 | B2 | 12/2009 | Lee et al. |
| 7,662,517 | B2 | 2/2010 | Lee et al. |
| 7,674,559 | B2 | 3/2010 | Min et al. |
| 7,682,740 | B2 | 3/2010 | Yong et al. |
| 7,682,751 | B2 | 3/2010 | Kato et al. |
| 7,687,202 | B2 | 3/2010 | Nishino et al. |
| 7,695,870 | B2 | 4/2010 | Park et al. |
| 7,704,641 | B2 | 4/2010 | Yong et al. |
| 7,709,140 | B2 | 5/2010 | Hennige |
| 7,709,152 | B2 | 5/2010 | Kim et al. |
| 7,709,153 | B2 | 5/2010 | Lee et al. |
| 7,745,042 | B2 | 6/2010 | Fujino et al. |
| 7,745,050 | B2 | 6/2010 | Kajita et al. |
| 7,754,375 | B2 | 7/2010 | Fujikawa et al. |
| 7,754,377 | B2 | 7/2010 | Ohata et al. |
| 7,758,998 | B2 | 7/2010 | Ohata et al. |
| 7,759,004 | B2 | 7/2010 | Ikuta et al. |
| 7,811,700 | B2 | 10/2010 | Hennige et al. |
| 7,816,038 | B2 | 10/2010 | Ohata et al. |
| 7,829,242 | B2 | 11/2010 | Hörpel et al. |
| 7,981,548 | B2 | 7/2011 | Mimura |
| 8,076,027 | B2 | 12/2011 | Honda et al. |
| 8,277,981 | B2 | 10/2012 | Kim et al. |
| 8,574,743 | B2 | 11/2013 | Kim et al. |
| 8,722,226 | B2 | 5/2014 | Chiang et al. |
| 8,722,227 | B2 | 5/2014 | Chiang et al. |
| 8,778,552 | B2 | 7/2014 | Chiang et al. |

(56)  References Cited

U.S. PATENT DOCUMENTS

| 8,883,347 B2 | 11/2014 | Baba et al. |
| 8,883,354 B2 | 11/2014 | Carlson et al. |
| 8,962,182 B2 | 2/2015 | Carlson |
| 8,993,159 B2 | 3/2015 | Chiang et al. |
| 9,065,120 B2 | 6/2015 | Carlson |
| 9,070,954 B2 | 6/2015 | Carlson et al. |
| 9,118,047 B2 | 8/2015 | Carlson |
| 9,153,833 B2 | 10/2015 | Chiang et al. |
| 9,178,200 B2 | 11/2015 | Bazzarella et al. |
| 9,180,412 B2 | 11/2015 | Jo et al. |
| 9,184,464 B2 | 11/2015 | Chiang et al. |
| 9,203,092 B2 | 12/2015 | Slocum et al. |
| 9,209,446 B2 | 12/2015 | Carlson |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,509,176 B2 | 11/2016 | Carter et al. |
| 9,583,780 B2 | 2/2017 | Chiang et al. |
| 9,614,231 B2 | 4/2017 | Carter et al. |
| 9,660,297 B2 | 5/2017 | Carlson |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 9,871,239 B2 | 1/2018 | Carlson et al. |
| 10,236,518 B2 | 3/2019 | Chiang et al. |
| 10,483,582 B2 | 11/2019 | Chiang et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,964,973 B2 | 3/2021 | Tan et al. |
| 11,121,437 B2 | 9/2021 | Bazzarella et al. |
| 11,309,531 B2 | 4/2022 | Slocum et al. |
| 11,316,156 B2 | 4/2022 | Woo et al. |
| 11,342,567 B2 | 5/2022 | Chiang et al. |
| 11,394,023 B2 | 7/2022 | Ofer et al. |
| 11,394,049 B2 | 7/2022 | Tan et al. |
| 11,646,437 B2 | 5/2023 | Bazzarella et al. |
| 11,811,119 B2 | 11/2023 | Chiang et al. |
| 11,888,144 B2 | 1/2024 | Slocum et al. |
| 11,909,077 B2 | 2/2024 | Chiang et al. |
| 2001/0000485 A1 | 4/2001 | Ying et al. |
| 2001/0038938 A1 | 11/2001 | Takahashi et al. |
| 2001/0053475 A1 | 12/2001 | Ying et al. |
| 2002/0092155 A1 | 7/2002 | Carlson et al. |
| 2002/0106561 A1 | 8/2002 | Lee et al. |
| 2002/0141029 A1 | 10/2002 | Carlson et al. |
| 2003/0003363 A1 | 1/2003 | Daido et al. |
| 2003/0003369 A1 | 1/2003 | Dai |
| 2003/0035995 A1 | 2/2003 | Ohsaki et al. |
| 2003/0059675 A1 | 3/2003 | Sasaki et al. |
| 2003/0118910 A1 | 6/2003 | Carlson |
| 2003/0124429 A1 | 7/2003 | Okada et al. |
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0058246 A1 | 3/2004 | Choi et al. |
| 2004/0175626 A1 | 9/2004 | Dasgupta et al. |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0022370 A1 | 2/2005 | Fu et al. |
| 2005/0026037 A1 | 2/2005 | Riley et al. |
| 2005/0221190 A1 | 10/2005 | Sudano et al. |
| 2005/0255345 A1 | 11/2005 | Gerritse et al. |
| 2005/0255769 A1 | 11/2005 | Henninge et al. |
| 2005/0266305 A1 | 12/2005 | Ohata et al. |
| 2006/0008698 A1 | 1/2006 | Kim et al. |
| 2006/0127753 A1 | 6/2006 | Nakashima et al. |
| 2006/0172158 A1 | 8/2006 | Min et al. |
| 2006/0172185 A1 | 8/2006 | Mimura |
| 2006/0177732 A1 | 8/2006 | Visco et al. |
| 2006/0222954 A1 | 10/2006 | Skotheim et al. |
| 2006/0275661 A1 | 12/2006 | Kim et al. |
| 2007/0009803 A1 | 1/2007 | Kim et al. |
| 2007/0020501 A1 | 1/2007 | Li et al. |
| 2007/0065714 A1 | 3/2007 | Hambitzer et al. |
| 2007/0108120 A1 | 5/2007 | Carlson |
| 2007/0110990 A1 | 5/2007 | Carlson |
| 2007/0111070 A1 | 5/2007 | Carlson |
| 2007/0178384 A1 | 8/2007 | Kajita et al. |
| 2007/0184350 A1 | 8/2007 | Kim et al. |
| 2007/0189959 A1 | 8/2007 | Carlson et al. |
| 2007/0190408 A1 | 8/2007 | Inoue et al. |
| 2007/0190427 A1 | 8/2007 | Carlson et al. |
| 2007/0204458 A1 | 9/2007 | Fujita et al. |
| 2007/0243460 A1 | 10/2007 | Carlson et al. |
| 2007/0269714 A1 | 11/2007 | Watanabe et al. |
| 2008/0032197 A1 | 2/2008 | Dorpel et al. |
| 2008/0160412 A1 | 7/2008 | Kasamatsu et al. |
| 2008/0166202 A1 | 7/2008 | Dunlap et al. |
| 2008/0182174 A1 | 7/2008 | Carlson et al. |
| 2008/0193845 A1 | 8/2008 | Muraoka et al. |
| 2008/0285208 A1 | 11/2008 | Sung et al. |
| 2009/0011337 A1 | 1/2009 | Kajita et al. |
| 2009/0017380 A1 | 1/2009 | Honda et al. |
| 2009/0029261 A1 | 1/2009 | Thomas-Alyea et al. |
| 2009/0067119 A1 | 3/2009 | Katayama et al. |
| 2009/0087728 A1 | 4/2009 | Less et al. |
| 2009/0098457 A1 | 4/2009 | Kwon et al. |
| 2009/0155676 A1 | 6/2009 | Zhamu et al. |
| 2009/0155678 A1 | 6/2009 | Less |
| 2009/0197175 A1 | 8/2009 | Nagai et al. |
| 2009/0197183 A1 | 8/2009 | Kato |
| 2009/0202912 A1 | 8/2009 | Baba et al. |
| 2009/0246631 A1 | 10/2009 | Hojo et al. |
| 2009/0246636 A1 | 10/2009 | Chiang et al. |
| 2009/0269489 A1 | 10/2009 | Hennige et al. |
| 2009/0290288 A1 | 11/2009 | Mitchell et al. |
| 2009/0311587 A1 | 12/2009 | Best et al. |
| 2010/0003592 A1 | 1/2010 | Baba et al. |
| 2010/0003595 A1 | 1/2010 | Issaev et al. |
| 2010/0047671 A1 | 2/2010 | Chiang et al. |
| 2010/0055370 A1 | 3/2010 | Diehl |
| 2010/0104817 A1 | 4/2010 | Carlson |
| 2010/0175245 A1 | 7/2010 | Do et al. |
| 2010/0261065 A1 | 10/2010 | Babinec et al. |
| 2010/0285352 A1 | 11/2010 | Juzkow et al. |
| 2010/0323264 A1 | 12/2010 | Chiang et al. |
| 2011/0052987 A1 | 3/2011 | Katayama et al. |
| 2011/0097623 A1 | 4/2011 | Marinis, Jr. et al. |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2011/0274948 A1 | 11/2011 | Duduta et al. |
| 2011/0281171 A1 | 11/2011 | Yong et al. |
| 2012/0028129 A1 | 2/2012 | Furuya |
| 2012/0050848 A1 | 3/2012 | Carlson et al. |
| 2012/0064399 A1 | 3/2012 | Carlson |
| 2012/0064404 A1 | 3/2012 | Carlson |
| 2012/0069429 A1 | 3/2012 | Barrett et al. |
| 2012/0107680 A1 | 5/2012 | Amiruddin et al. |
| 2012/0135257 A1 | 5/2012 | Carlson et al. |
| 2012/0141877 A1 | 6/2012 | Choi et al. |
| 2012/0164499 A1 | 6/2012 | Chiang et al. |
| 2012/0189898 A1 | 7/2012 | Wakizaka et al. |
| 2012/0231321 A1 | 9/2012 | Huang et al. |
| 2012/0258348 A1 | 10/2012 | Hayakawa et al. |
| 2013/0055559 A1 | 3/2013 | Slocum et al. |
| 2013/0065122 A1 | 3/2013 | Chiang et al. |
| 2013/0089770 A1 | 4/2013 | Nishikawa |
| 2013/0149613 A1 | 6/2013 | Yoshikawa et al. |
| 2013/0171500 A1* | 7/2013 | Xu .................... H01G 11/52 429/188 |
| 2013/0224555 A1* | 8/2013 | Hong ............... H01M 50/443 429/144 |
| 2013/0260207 A1 | 10/2013 | Jemura |
| 2013/0309547 A1 | 11/2013 | Bazzarella et al. |
| 2013/0323542 A1 | 12/2013 | Wijayawardhana et al. |

(56)     References Cited

U.S. PATENT DOCUMENTS

| 2013/0337319 A1 | 12/2013 | Doherty et al. |
| 2013/0337349 A1 | 12/2013 | Brost et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0065464 A1 | 3/2014 | Masarapu et al. |
| 2014/0154546 A1 | 6/2014 | Carter et al. |
| 2014/0170464 A1 | 6/2014 | Iwase |
| 2014/0170524 A1 | 6/2014 | Chiang et al. |
| 2014/0248521 A1 | 9/2014 | Chiang et al. |
| 2014/0315084 A1 | 10/2014 | Liu et al. |
| 2014/0315097 A1 | 10/2014 | Tan et al. |
| 2015/0024279 A1 | 1/2015 | Tan et al. |
| 2015/0030933 A1 | 1/2015 | Goetzen et al. |
| 2015/0056426 A1 | 2/2015 | Grouchko et al. |
| 2015/0129081 A1 | 5/2015 | Chiang et al. |
| 2015/0140371 A1 | 5/2015 | Slocum |
| 2015/0162586 A1 | 6/2015 | Fleischmann et al. |
| 2015/0171398 A1 | 6/2015 | Roumi |
| 2015/0171406 A1 | 6/2015 | Bazzarella et al. |
| 2015/0249249 A1 | 9/2015 | Ortega et al. |
| 2015/0280267 A1 | 10/2015 | Chiang et al. |
| 2015/0295272 A1 | 10/2015 | Chiang et al. |
| 2015/0299551 A1 | 10/2015 | Ota et al. |
| 2015/0340676 A1 | 11/2015 | Schmidhauser et al. |
| 2015/0357626 A1 | 12/2015 | Holman et al. |
| 2015/0364790 A1 | 12/2015 | Yonehara et al. |
| 2016/0006081 A1 | 1/2016 | Eaglesham et al. |
| 2016/0013461 A1 | 1/2016 | Mizuno et al. |
| 2016/0013507 A1 | 1/2016 | Chiang et al. |
| 2016/0054590 A1 | 2/2016 | Flitsch et al. |
| 2016/0056437 A1 | 2/2016 | Huang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0141579 A1 | 5/2016 | Seok et al. |
| 2016/0141621 A1 | 5/2016 | Negishi et al. |
| 2016/0164145 A1 | 6/2016 | Carlson |
| 2016/0190536 A1 | 6/2016 | Park et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372784 A1 | 12/2016 | Hayner et al. |
| 2016/0372802 A1 | 12/2016 | Chiang et al. |
| 2017/0012264 A1 | 1/2017 | Carlson et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0098857 A1 | 4/2017 | Carlson |
| 2017/0149088 A1 | 5/2017 | Ueno et al. |
| 2017/0162863 A1 | 6/2017 | Doherty et al. |
| 2017/0187078 A1 | 6/2017 | Keates et al. |
| 2017/0214034 A1 | 7/2017 | Ota et al. |
| 2017/0222206 A1 | 8/2017 | Carlson |
| 2017/0237111 A1 | 8/2017 | Holman et al. |
| 2017/0237112 A1 | 8/2017 | Holman et al. |
| 2017/0271638 A1 | 9/2017 | Xu et al. |
| 2017/0288281 A1 | 10/2017 | Chiang et al. |
| 2017/0324073 A1 | 11/2017 | Herle |
| 2018/0034090 A1 | 2/2018 | Chiang et al. |
| 2018/0047963 A1 | 2/2018 | Carlson et al. |
| 2018/0108893 A1 | 4/2018 | Yang |
| 2018/0175428 A1 | 6/2018 | Chiang et al. |
| 2018/0175445 A1 | 6/2018 | Tan et al. |
| 2018/0219250 A1 | 8/2018 | Delobel et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0044196 A1 | 2/2019 | Kang et al. |
| 2019/0058184 A1 | 2/2019 | Bazzarella et al. |
| 2019/0181496 A1 | 6/2019 | Visco et al. |
| 2019/0245242 A1 | 8/2019 | Tan et al. |
| 2019/0267598 A1 | 8/2019 | Xu et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0144686 A1 | 5/2020 | Jang et al. |
| 2020/0161688 A1 | 5/2020 | Chiang et al. |
| 2020/0207237 A1 | 7/2020 | Zuo et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0266407 A1 | 8/2020 | Honda et al. |
| 2020/0266479 A1 | 8/2020 | Hupfer et al. |
| 2020/0303707 A1 | 9/2020 | Zhou et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0395069 A1 | 12/2020 | Tang et al. |
| 2020/0395583 A1 | 12/2020 | Carlson et al. |
| 2020/0411825 A1 | 12/2020 | Bazzarella et al. |
| 2021/0080364 A1 | 3/2021 | Lee et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0257679 A1 | 8/2021 | Tour et al. |
| 2021/0265631 A1 | 8/2021 | Chen et al. |
| 2021/0273268 A1 | 9/2021 | Yu et al. |
| 2021/0296733 A1 | 9/2021 | Carlson et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0294079 A1 | 9/2022 | Zhang et al. |
| 2022/0299572 A1 | 9/2022 | Aoki |
| 2022/0344775 A1 | 10/2022 | Carlson et al. |
| 2022/0344776 A1 | 10/2022 | Carlson |
| 2022/0352597 A1 | 11/2022 | Chen et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0261247 A1 | 8/2023 | Ju et al. |
| 2023/0282906 A1 | 9/2023 | Chen et al. |
| 2023/0291063 A1 | 9/2023 | Holman et al. |

(56) References Cited

U.S. PATENT DOCUMENTS

| | | |
|---|---|---|
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2023/0411695 A1 | 12/2023 | Narita et al. |
| 2024/0039001 A1 | 2/2024 | Kusachi et al. |
| 2024/0039120 A1 | 2/2024 | Carlson |
| 2024/0047689 A1 | 2/2024 | Hartzog et al. |
| 2024/0047772 A1 | 2/2024 | Hartzog et al. |
| 2024/0047810 A1 | 2/2024 | Hartzog et al. |
| 2024/0047832 A1 | 2/2024 | Hartzog et al. |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0128541 A1 | 4/2024 | Nematollahi |
| 2024/0178502 A1 | 5/2024 | Ota |
| 2024/0204264 A1 | 6/2024 | Chen et al. |
| 2024/0204288 A1 | 6/2024 | Nematollahi |
| 2024/0213572 A1 | 6/2024 | Nematollahi |
| 2024/0274855 A1 | 8/2024 | Chiang et al. |
| 2024/0304942 A1 | 9/2024 | Patel et al. |

FOREIGN PATENT DOCUMENTS

| | | |
|---|---|---|
| CN | 1285084 A | 2/2001 |
| CN | 1492523 A | 4/2004 |
| CN | 1167163 C | 9/2004 |
| CN | 1175505 C | 11/2004 |
| CN | 101504991 A | 8/2009 |
| CN | 101796668 A | 8/2010 |
| CN | 101796668 B | 8/2010 |
| CN | 101946344 A | 1/2011 |
| CN | 102242464 A | 11/2011 |
| CN | 102437302 A | 5/2012 |
| CN | 102460772 A | 5/2012 |
| CN | 202221791 U | 5/2012 |
| CN | 102640329 A | 8/2012 |
| CN | 102640329 B | 8/2012 |
| CN | 102769116 A | 11/2012 |
| CN | 102959765 A | 3/2013 |
| CN | 103262305 A | 8/2013 |
| CN | 103282408 A | 9/2013 |
| CN | 103283060 A | 9/2013 |
| CN | 105247703 A | 1/2016 |
| CN | 106654130 A | 5/2017 |
| EP | 0143562 A1 | 6/1985 |
| EP | 0421660 A2 | 4/1991 |
| EP | 0523840 A1 | 1/1993 |
| EP | 0523840 B1 | 1/1993 |
| EP | 0600718 A2 | 6/1994 |
| EP | 0600718 B1 | 6/1994 |
| EP | 0814520 A2 | 12/1997 |
| EP | 0836238 A1 | 4/1998 |
| EP | 0836238 B1 | 4/1998 |
| EP | 0848435 A1 | 6/1998 |
| EP | 0848435 B1 | 6/1998 |
| EP | 0875950 A2 | 11/1998 |
| EP | 0892449 A1 | 1/1999 |
| EP | 1156544 A2 | 11/2011 |
| EP | 3133671 A1 | 2/2017 |
| EP | 4117104 A1 | 1/2023 |
| FR | 3007207 A1 | 12/2014 |
| JP | S4610339 Y1 | 4/1971 |
| JP | H05283108 A | 10/1993 |
| JP | H0614077 A | 1/1994 |
| JP | H06140077 A | 5/1994 |
| JP | H06275313 A | 9/1994 |
| JP | H087895 A | 1/1996 |
| JP | H08255615 A | 10/1996 |
| JP | H0927343 A | 1/1997 |
| JP | H10214639 A | 8/1998 |
| JP | H10228925 A | 8/1998 |
| JP | H11233144 A | 8/1999 |
| JP | 2000011986 A | 1/2000 |
| JP | 2000323129 A | 11/2000 |
| JP | 2001143690 A | 5/2001 |
| JP | 2002042882 A | 2/2002 |
| JP | 2002203542 A | 7/2002 |
| JP | 2002532852 A | 10/2002 |
| JP | 2003517418 A | 5/2003 |
| JP | 2003223926 A | 8/2003 |
| JP | 2004119367 A | 4/2004 |
| JP | 2005022674 A | 1/2005 |
| JP | 2005235695 A | 2/2005 |
| JP | 2005508070 A | 3/2005 |
| JP | 2005190785 A | 7/2005 |
| JP | 2006236994 A | 9/2006 |
| JP | 2006269358 A | 10/2006 |
| JP | 2007227136 A | 9/2007 |
| JP | 2007258160 A | 10/2007 |
| JP | 2008041404 A | 2/2008 |
| JP | 2008048838 A | 3/2008 |
| JP | 2008066094 A | 3/2008 |
| JP | 2008123988 A | 5/2008 |
| JP | 2008140551 A | 6/2008 |
| JP | 2008171593 A | 7/2008 |
| JP | 2008-210541 A | 9/2008 |
| JP | 2008226566 A | 9/2008 |
| JP | 2008234879 A | 10/2008 |
| JP | 2008266593 A | 11/2008 |
| JP | 2009064566 A | 3/2009 |
| JP | 2009176552 A | 8/2009 |
| JP | 2009188037 A | 8/2009 |
| JP | 4426721 B2 | 3/2010 |
| JP | 2010056036 A | 3/2010 |
| JP | 2010123383 A | 6/2010 |
| JP | 2010202987 A | 9/2010 |
| JP | 2011065849 A | 3/2011 |
| JP | 2011233144 A | 11/2011 |
| JP | 2012018773 A | 1/2012 |
| JP | 2012069283 A | 4/2012 |
| JP | 4932263 B2 | 5/2012 |
| JP | 5183016 B2 | 4/2013 |
| JP | 2013161684 A | 8/2013 |
| JP | 2013535113 A | 9/2013 |
| JP | 2013535773 A | 9/2013 |
| JP | 2013211185 A | 10/2013 |
| JP | 2014127440 A | 7/2014 |
| JP | 2014186942 A | 10/2014 |
| JP | 2015018635 A | 1/2015 |
| JP | 2015504234 A | 2/2015 |
| JP | 2015230796 A | 12/2015 |
| JP | 2016110886 A | 6/2016 |
| JP | 2016517161 A | 6/2016 |
| JP | 2016149202 A | 8/2016 |
| JP | 6275313 B2 | 2/2018 |
| JP | 2021093379 A | 6/2021 |
| KR | 20070069171 A | 7/2007 |
| KR | 20080063793 A | 7/2008 |
| KR | 20090026190 A | 3/2009 |
| KR | 1020090052556 A | 5/2009 |
| KR | 20090123894 A | 12/2009 |
| KR | 100951698 B1 | 4/2010 |
| KR | 20100137530 A | 12/2010 |
| KR | 20110079744 A | 7/2011 |
| KR | 20110116489 A | 10/2011 |
| KR | 20120062333 A | 6/2012 |
| KR | 20120110111 A | 10/2012 |
| KR | 20130036043 A | 4/2013 |
| KR | 20130054346 A | 5/2013 |
| KR | 20140018171 A | 2/2014 |
| KR | 20140024464 A | 2/2014 |
| KR | 20150108040 A | 9/2015 |
| KR | 20170106523 A | 9/2017 |
| WO | 9102385 A1 | 2/1991 |
| WO | 9103080 A1 | 3/1991 |

(56) References Cited

FOREIGN PATENT DOCUMENTS

| WO | 9708763 A1 | 3/1997 |
|---|---|---|
| WO | 9931751 A1 | 6/1999 |
| WO | 9933125 A1 | 7/1999 |
| WO | 99057770 A1 | 11/1999 |
| WO | 2000076011 A3 | 12/2000 |
| WO | WO-0076011 A2 | 12/2000 |
| WO | 2001003824 A1 | 1/2001 |
| WO | 2001039293 A2 | 5/2001 |
| WO | 2001039303 A1 | 5/2001 |
| WO | WO-2005011043 A1 | 2/2005 |
| WO | 2005022674 A1 | 3/2005 |
| WO | WO-2006080265 A1 | 8/2006 |
| WO | 2006123892 A1 | 11/2006 |
| WO | WO-2007006011 A2 | 1/2007 |
| WO | WO-2007076011 A1 | 7/2007 |
| WO | 2007095348 A2 | 8/2007 |
| WO | 2007120763 A3 | 10/2007 |
| WO | 2007135790 A1 | 11/2007 |
| WO | WO-2008087966 A1 | 7/2008 |
| WO | WO-2008099468 A1 | 8/2008 |
| WO | WO-2008114727 A1 | 9/2008 |
| WO | WO-2008143005 A1 | 11/2008 |
| WO | 2008150070 A1 | 12/2008 |
| WO | 2009014388 A2 | 1/2009 |
| WO | 2009026467 A1 | 2/2009 |
| WO | WO-2009044741 A1 | 4/2009 |
| WO | 2009066946 A3 | 5/2009 |
| WO | WO-2009066946 A2 | 5/2009 |
| WO | WO-2009120812 A2 | 10/2009 |
| WO | 2010016881 A1 | 2/2010 |
| WO | WO-2010103824 A1 | 9/2010 |
| WO | 2010138176 A1 | 12/2010 |
| WO | 2010138177 A1 | 12/2010 |
| WO | 2010138178 A1 | 12/2010 |
| WO | 2010138179 A1 | 12/2010 |
| WO | WO-2011065849 A1 | 6/2011 |
| WO | WO-2011112885 A1 | 9/2011 |
| WO | 2012011944 A2 | 1/2012 |
| WO | WO-2012005139 A1 | 1/2012 |
| WO | WO-2012011157 A1 | 1/2012 |
| WO | WO-2012088442 A2 | 6/2012 |
| WO | WO-2012113157 A1 | 8/2012 |
| WO | WO-2013139303 A1 | 9/2013 |
| WO | 2013146126 A1 | 10/2013 |
| WO | WO-2014052533 A1 | 4/2014 |
| WO | 2014119665 A1 | 8/2014 |
| WO | WO-2014179355 A1 | 11/2014 |
| WO | 2015004069 A1 | 1/2015 |
| WO | WO-2015074065 A1 | 5/2015 |
| WO | 2016168715 A1 | 10/2016 |
| WO | 2017008081 A1 | 1/2017 |
| WO | WO-2018050067 A1 | 3/2018 |
| WO | WO-2019074925 A1 | 4/2019 |
| WO | WO-2019136467 A1 | 7/2019 |
| WO | WO-2021087465 A1 | 5/2021 |
| WO | WO-2022040103 A1 | 2/2022 |
| WO | WO-2022232625 A2 | 11/2022 |
| WO | WO-2024130246 A1 | 6/2024 |

OTHER PUBLICATIONS

Liang et al., "Introduction to Heat Transfer Theory of Polymer Composites," South China University of Technology Press, 1st edition, Mar. 2013, pp. 53-54, (with English language translation of relevant portions).

First Office Action for CN Application No. 201480026808.5, Issuing date Apr. 19, 2017.

Second Office Action for CN Application No. 201480026808.5, Issuing date Mar. 19, 2018.

"Notification of Reasons for Refusal" for JP Application No. 2016-511812, Issuing date Mar. 6, 2018.

Min Kim et al., "Preparation of a Trilayer Separator and its Application to Lithium-ion Batteries", Journal of Power Sources, Elesevier SA, CH, vol. 195, No. 24, Jul. 2, 2010, pp. 8302-8305.

Daigo Takemura, et al., "A Powder Particle Size Effect on Ceramic Powder Based Separator for Lithium Rechargeable Battery", Journal of Power Sources, Elesevier SA, vol. 146, 2005, pp. 779-783.

R.J.R. Uhlhorn, et al., "Synthesis of Ceramic Membranes", Journal of Materials Science 27 (1992) 527-537.

International Search Report and Written Opinion received in PCT Application No. PCT/US2014/035947, mailed date Sep. 5, 2014, 15 pages.

International Preliminary Report on Patentability received in PCT Application No. PCT/US2014/035947, date of issuance of report Nov. 3, 2015, 10 pages.

Korean Intellectual Patent Office, "Office Action", issued on Mar. 18, 2020 in Korean Patent Application No. 10-2015-7033742, which is a KR counterpart to U.S. Appl. No. 14/787,426, including cited references and English language translation thereof.

Japan Patent Office, "Notification of Reason for Refusal", issued in Japanese Patent Application No. 2016-511812, which is a JP counterpart to U.S. Appl. No. 14/787,426, mailed on Feb. 14, 2020, 5 pages (2 pages of English translation of Office Action, 3 pages of Original Office Action).

Third Office Action for Chinese Patent Application No. 201480026808. 5, issuing date Nov. 19, 2018, which is a CN counterpart to U.S. Appl. No. 14/787,426.

Decision of Refusal for Japanese Application No. 2023-065846, mailed Dec. 26, 2023, with English translation, 6 pages.

Decision to Grant a Patent for Japanese Application No. 2016-511812 mailed Mar. 22, 2021, with English translation, 5 pages.

Decision to Grant a Patent for Japanese Application No. 2021-036116, mailed Mar. 14, 2023, with English translation, 6 pages.

Decision to Grant a Patent for Japanese Application No. 2021-084961, mailed Jul. 12, 2022, with English translation, 6 pages.

Gomez-Martin et al., "Opportunities and Challenges of Li2C4O4 as Pre-Lithiation Additive for the Positive Electrode in NMC622||Silicon/ Graphite Lithium Ion Cells," Advanced Science, Aug. 2022, 9(24):2201742, 15 pages.

Holtmann et al., "Boehmite-based ceramic separator for lithium-ion batteries," Journal of Applied Electrochemistry, Jan. 2016, vol. 46, pp. 69-76.

Ikezawa A., et al., "Performance of Li4Ti5O12-based Reference Electrode for the Electrochemical Analysis of All-solid-state Lithium-ion Batteries," Electrochemistry Communications, Jul. 2020, vol. 116: 106743, 5 pages.

Liu et al., "Controllable long-term lithium replenishment for enhancing energy density and cycle life of lithium-ion batteries," Energy & Environmental Science, 2024, 17(3):1163-1174.

Matsuzaki et al., "Application of Na2CO3 as a Sacrificial Electrode Additive in Na-ion Batteries to Compensate for the Sodium Deficiency in Na2/3[Fe1/2Mn1/2]O2," Batteries & Supercaps, May 2024, 7(5):e202400009, 9 pages.

Nestler et al., "Separators—Technology Review: Ceramic based Separators for Secondary Batteries," AIP Conference Proceedings, Jan. 1, 2014, vol. 1597(1), pp. 155-184, New York, US, ISSN: 3084-243X, DOI: 10,1063/1.4878486.

Notice of Final Rejection for Korean Application No. 10-2015-7033742, mailed Dec. 2, 2020, with English translation, 7 pages.

Notice of Reasons for Refusal for Japanese Application No. 2016-511812 mailed Feb. 8, 2019, with English translation, 6 pages.

Notice of Reasons for Refusal for Japanese Application No. 2016-511812 mailed Sep. 8, 2020, with English translation, 6 pages.

Notice of Reasons for Refusal for Japanese Application No. 2021-036116, mailed May 24, 2022, with English translation, 4 pages.

Notice of Reasons for Refusal for Japanese Application No. 2021-036116, mailed Nov. 8, 2022, with English translation, 4 pages.

Notice of Reasons for Refusal for Japanese Application No. 2023-065846, mailed Jul. 25, 2023, with English translation, 8 pages.

Office Action for Chinese Application No. 201910729814.1, mailed Apr. 7, 2022, with English translation, 18 pages.

Office Action for Chinese Application No. 201910729814.1, mailed Aug. 23, 2021, with English translation, 14 pages.

Piana M., et al., "Stability of a Pyrrolidinum-Based Ionic Liquid in Li-0 2 Cells," Journal of the Electrochemical Society, Jan. 2014, vol. 161(14), pp. A1992-A2001.

(56) References Cited

OTHER PUBLICATIONS

Steven et al., U.S. Appl. No. 60/773,487 titled "Methods of preparing separators for electrochemical cells," files Feb. 15, 2006, 30 pages.

Written Decision on Registration for Korean Application No. 10-2021-7009222 mailed May 21, 2021, with English translation, 4 pages.

Written Decision on Registration for Korean Application No. 10-2021-7026353 mailed Jun. 24, 2022, with English translation, 4 pages.

Written Decision on Registration for Korean Application No. 10-2022-7033343 mailed Dec. 19, 2022, with English translation, 6 pages.

Zhang et al., "Sulfonated polyimide/AlOOH composite membranes with decreased vanadium permeability and increased stability for vanadium redox flow battery", Journal of Solid State Electrochemistry, Springer, Berlin, DE, vol. 18, No. 12, Jul. 18, 2014, pp. 3479-3490.

* cited by examiner

NANOPOROUS COMPOSITE SEPARATORS WITH INCREASED THERMAL CONDUCTIVITY

CROSS-REFERENCE TO RELATED APPLICATIONS

This patent application is a Continuation of U.S. patent application Ser. No. 17/563,430, filed on Dec. 28, 2021, which is a Continuation of U.S. patent application Ser. No. 16/927,435, filed on Jul. 13, 2020 (now U.S. Pat. No. 11,217,859), which is a Continuation of U.S. patent application Ser. No. 14/787,426, filed Oct. 27, 2015 (now U.S. Pat. No. 10,879,513), entitled NANOPOROUS COMPOS-ITE SEPARATORS WITH INCREASED THERMAL CONDUCTIVITY, which is a National Phase application under 35 U.S.C. § 371 of International Application No. PCT/US2014/035947, filed Apr. 29, 2014, which claims the benefit under 35 U.S.C. § 119 (e) of U.S. Provisional Application No. 61/817,119, filed Apr. 29, 2013, each of which is incorporated by reference herein.

FIELD OF THE DISCLOSURE

The present disclosure relates generally to the field of porous membranes and to electric current producing cells and separators for use in electric current producing cells. More particularly, this disclosure pertains to a porous separator membrane comprising an inorganic oxide or other inorganic material where the membrane has increased thermal conductivity compared to porous separator membranes consisting of polyolefin materials. Also, the present disclosure pertains to electric current producing cells, such as lithium ion cells and capacitors, comprising such porous separators with increased thermal conductivity.

BACKGROUND OF THE DISCLOSURE

Lithium batteries, including rechargeable or secondary lithium ion batteries, non-rechargeable or primary lithium batteries, and other types such as lithium-sulfur batteries, are typically made by interleaving a plastic separator, a metal substrate with a cathode layer coated on both sides, another plastic separator, and another metal substrate with an anode layer coated on both sides. To maintain the alignment of the strips of these materials and for other quality reasons, this interleaving is usually done on automatic equipment, which is complex and expensive. Also, in order to achieve suffi-cient mechanical strength and integrity, the separators and the metal substrates are relatively thick, such as 10 μm or more in thickness. For example, a typical thickness of the copper metal substrate for the anode coating layers is 10 μm, a typical thickness of the aluminum metal substrate for the cathode coating layers is 12 μm, and the plastic separators typically have thicknesses ranging from 12-20 μm. These thick separators and metal substrates are not electrochemi-cally active and thus lower the volume of the electroactive material in the electrodes of the lithium batteries. This limits the energy density and power density of the lithium batter-ies.

SUMMARY OF THE DISCLOSURE

One aspect of the present disclosure pertains to a porous battery separator including ceramic particles and a poly-meric binder, wherein the porous separator has a porosity between 35-50% and an average pore size between 10-50 nm. In some cases, the ceramic particles are selected from the group consisting of inorganic oxide particles and inor-ganic nitride particles. In some cases, the porous separator exhibits less than 1% shrinkage when exposed to a tempera-ture of 200° C. for at least one hour. In some cases, the ceramic particles include at least one of $Al_2O_3$, AlO(OH) or boehmite, AlN, BN, SiN, ZnO, $ZrO_2$, $SiO_2$, and combina-tions thereof. In some cases, the ceramic particles include between 65-95% boehmite and a remainder of BN. In some cases, the ceramic particles include between 65-95% boeh-mite and a remainder of AlN. In some cases, the average pore size is between 10-90 nm. In some cases, less than 1% of the pores have a size outside of 10-90 nm. In some cases, the porosity is between 35-50%. In some cases, the poly-meric binder includes a polymer selected from polyvi-nylidene difluoride (PVdF) and copolymers thereof, poly-vinyl ethers, urethanes, acrylics, cellulosics, styrene-butadiene copolymers, natural rubbers, chitosan, nitrile rubbers, silicone elastomers, PEO or PEO copolymers, polyphosphazenes, and combinations thereof. In some cases, the porous separator has a thermal conductivity that increases when temperature is raised from 25° C. to 50° C. and tested using one of ASTM E1461 and ASTM 1530. In some cases, the separator has a pore volume and greater than 90% of the pore volume includes pores having a pore diameter of less than 100 nm.

Another aspect of the present disclosure pertains to an electrochemical cell including an anode, a cathode, an organic electrolyte, comprising a lithium salt, and a porous separator layer including an organic polymer and a ceramic material, wherein the porous separator layer has a porosity between 35-50% and an average pore size between 10-90 nm and exhibits less than 1% shrinkage when exposed to a temperature of 200° C. for at least one hour. In some cases, the inorganic ceramic particles are selected from the group consisting of inorganic oxide particles and inorganic nitride particles. In some cases, the inorganic ceramic particles include $Al_2O_3$, AlO(OH) or boehmite, AlN, BN, SiN, ZnO, $ZrO_2$, $SiO_2$, and combinations thereof; and the organic polymer includes PVdF and copolymers thereof, polyvinyl ethers, urethanes, acrylics, cellulosics, styrene-butadiene copolymers, natural rubbers, chitosan, nitrile rubbers, sili-cone elastomers, PEO or PEO copolymers, polyphospha-zenes, and combinations thereof. In some cases, the average pore size is between 25-35 nm. In some cases, the porosity is between 40-45%.

Another aspect of the present disclosure pertains to a method of manufacturing a flexible porous composite sepa-rator. The method includes formulating a dispersion, wherein the dispersion includes an organic polymeric mate-rial, an inorganic ceramic material, and a solvent; applying the dispersion to a substrate to form a coating; drying and curing the coating; and removing the coating from the substrate thereby forming a flexible porous composite sepa-rator, wherein the porous separator has a porosity between 35-50% and an average pore size between 10-50 nm and exhibits less than 1% shrinkage when exposed to a tempera-ture of 200° C. for at least one hour. In some cases, the average pore size is between 20-40 nm and the porosity of the porous composite separator is between 40-45%. In some cases, the inorganic ceramic material includes at least one of boehmite, BN, and AlN.

Another aspect of the present disclosure pertains to a method of transferring heat through a battery including raising the temperature of an electrode in a lithium ion battery, and transferring heat from the electrode through a separator to a second electrode, the separator comprising porous ceramic particles and a polymer, wherein the separator has a porosity of 35-50% and an average pore size between 10-50 nm. In some cases, the average pore size is between 20-40 nm. In some cases, the separator has a plurality of pores and each of the pores has a diameter between 10-50 nm. In some cases, the separator has a plurality of pores and none of the pores has a diameter greater than 100 nm. In some cases, the separator has a porosity between 40-45%. In some cases, the separator exhibits less than 1% shrinkage when exposed to a temperature of 200° C. for at least one hour.

Another aspect of the present disclosure pertains to a flexible composite ceramic separator including a polymer; a first inorganic particulate material dispersed uniformly in the polymer; a second inorganic particulate material dispersed uniformly in the polymer, the second inorganic particulate material differing in either particle size or composition from the first inorganic particulate material; and wherein the flexible composite ceramic separator exhibits a thermal conductivity that is greater than the thermal conductivity of a comparative composite ceramic separator of the same composition that differs only in that it only includes a single inorganic particulate material at the same weight loading as the sum of the loadings of the first and second inorganic particulate materials. In some cases, the single inorganic particulate in the comparative composite ceramic separator is the same as one of the inorganic particulate materials of the flexible composite ceramic separator.

BRIEF DESCRIPTION OF THE FIGURES

For the purpose of illustrating the disclosure, particular experimental data are shown in the figures. It should be understood, however, that the disclosure is not limited to the precise data shown.

DETAILED DESCRIPTION OF THE DISCLOSURE

Figure 1:
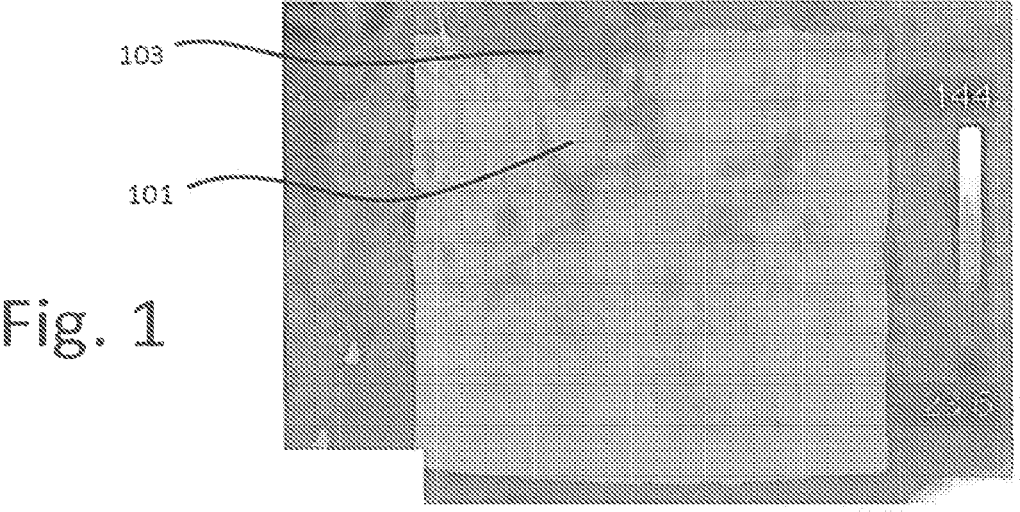
FIGS. 1-2 show thermograms of a polymeric separator and boehmite-based separator prepared according to an embodiment of the present disclosure.

Nanoporous composite separators are disclosed comprising a composite of porous/nanoporous inorganic material and an organic polymer material. Such composite separators may be used, for instance, in batteries and/or capacitors. The inorganic material may comprise $Al_2O_3$, $AlO(OH)$ or boehmite, $AlN$, $BN$, $SiN$, $ZnO$, $ZrO_2$, $SiO_2$, or combinations thereof. The organic polymer material may include, for example, polyvinylidene difluoride (PVdF) and/or copolymers thereof, polyvinyl ethers, urethanes, acrylics, celluloses, styrene-butadiene copolymers, natural rubbers, chitosan, nitrile rubbers, silicone elastomers, polyethylene oxide (PEO) or PEO copolymers, polyphosphazenes, or combinations thereof. In one embodiment, the flexible nanoporous composite separator has a porosity between 35-50% or between 40-45% and an average pore size between 10-50 nm. The separator may be formed by coating a substrate with a dispersion including the inorganic material, organic material, and a solvent. Once dried, the coating may be removed from the substrate, thus forming the nanoporous composite separator. A nanoporous composite separator may provide thermal conductivity and dimensional stability at temperatures above 200° C.

General Overview

The porous separator serves a key role in battery designs including prevention of physical contact between the anode and cathode, while facilitating ion transport for electrochemical energy supply as needed. Large format Li-ion batteries may operate in an average temperature range between 20-70° C.; however, spikes in battery charge and/or discharge can push short term temperatures of such batteries beyond 110° C. Separators used for lithium ion batteries are typically polyolefin separators, such as polypropylene or polyethylene that may shrink and/or melt at such high temperatures due to, among other things, chemical breakdown. Although these plastic separators have the low electrical conductivity needed to insulate the electrodes of batteries from each other, plastic separators also have very low thermal conductivity and are therefore slow or inefficient in dissipating heat within a battery. As lithium ion batteries are increasingly utilized for higher capacity applications, such as for electric and/or hybrid vehicles, the need for improved safety is greatly increased because of the large size and high power rates of these batteries. In some cases, the battery separators may be required to maintain dimensional stability (i.e., <5.0% shrinkage of the separator material) at temperatures at or above 200° C. in order to ensure battery performance and safety. Coating of polyolefin separators with ceramic-based materials, and/or selecting higher melting polymer-based materials (PET, polyamides, PVdF, etc.) may increase the thermal stability/battery failure temperature somewhat; however, such techniques increase costs and fail to address a fundamental separator design issue: rapid, efficient, and uniform heat transfer throughout the cell.

Thus, in accordance with an embodiment of the present disclosure, nanoporous inorganic separator materials are disclosed which are electrically isolating, thermally conductive, and maintain dimensional stability at temperatures above 200° C. In one embodiment, a nanoporous separator layer includes an inorganic material (also called ceramic and/or ceramic filler material) and an organic polymer which acts as a binder to hold the inorganic material together. This nanoporous composite separator exhibits a balance of mechanical strength, ionic conductivity, thermal conductivity, and electrical insulation rendering it suitable as a separator membrane for electrochemical cells. Suitable inorganic ceramic materials may include, for example, high thermal-conductivity ceramic particles such as $Al_2O_3$, $AlO(OH)$ or boehmite, AlN, BN, SiN, ZnO, $ZrO_2$, $SiO_2$, and combinations of the above. A nanoporous composite separator may be formed, in some embodiments, by dispersing one or more of these inorganic materials with an organic or inorganic polymer material including, but not limited to: PVdF and/or copolymers thereof, polyvinyl ethers, urethanes, acrylics, cellulosics, styrene-butadiene copolymers, natural rubbers, chitosan, nitrile rubbers, silicone elastomers, PEO or PEO copolymers, polyphosphazenes, and combinations of the above.

Table 1 provides a number of suitable example inorganic ceramic materials suitable for forming the nanoporous composite separator disclosed herein. The inorganic materials are listed along with their corresponding thermal and electrical properties.

TABLE 1

| inorganic material | thermal conductivity (W/m-K) | volume resistivity ('Ω-cm) |
|---|---|---|
| h-BN | 600/30* | $>10^{14}$ |
| AlN | 285 | $>10^{14}$ |
| $Al_2O_3$ | 30 | $>10^{14}$ |
| AlON | 12.3 | — |
| silica | 1.3 | $>10^{10}$ |
| $TiO_2$ | 11.7 | $\sim10^{12}$ |
| $ZrO_2$ | 1.7 | $>10^{10}$ |

The thermal conductivity of hexagonal-Boron Nitride (h-BN) may be 600 or 30, in some embodiments, depending on its orientation. In addition to the inorganic materials shown in Table 1, the inorganic material may include boehmite, or a combination of any of these materials. Boehmite is a hydrated form of alumina that may be stable up to temperatures exceeding 600° C. The crystal structure of boehmite is octahedral and is arranged in corrugated layers and is thus less prone to moisture pick-up than other aluminum based materials. In some embodiments, the various properties of the nanoporous composite separator may be tailored by adjusting, for example, particle size, organic polymer, particle size distribution, porosity of the inorganic material, specific surface area, and/or surface treatment of the nanoporous material. In some embodiments, the particle size distribution of the composite separator may be customized by blending boehmite with the various other inorganic materials in various proportions. For example, the nanoporous separator material may be pure boehmite (having less than 1% impurities), may be 90% boehmite and 10% BN or AlN, or it may be 70% boehmite and 30% BN or AlN. Various other proportions and combinations of these inorganic materials will be apparent, in light of this disclosure, and the present disclosure is not intended to be limited to any particular combination or proportion of inorganic materials. In some embodiments, the nanoporous composite separator includes inorganic particles and an organic polymer to bond the inorganic particles together to form a homogeneous separator.

In one specific example embodiment, a nanoporous composite separator was prepared by mixing a 4:1 by weight blend of a boehmite pigment with a PVdF polymer and dispersants in an organic solvent blend comprising N-methylpyrrolidone (NMP) and 2-butanone and coating this mixture onto a silicone release film. In other embodiments, the solvent may comprise other suitable solvents or combinations of solvents such as, for example, benzene, ethyl benzene, toluene, xylene, MEK, NMP, or 2-butanone. Upon oven drying and subsequent delamination from the release substrate, a porous boehmite-based separator of 20 μm in thickness was obtained. The porosity of this separator was about 42%, and the separator showed less than 1% shrinkage when heated in an oven at 220° C. for 1 hour. In another embodiment, the nanoporous composite separator showed less than 0.5% shrinkage under similar heating conditions.

In another example embodiment, the organic polymer material may be a high molecular weight grade of PVdF, such as Solvay® Solef 5130 PVdF. This particular organic material can provide strong adhesion to current collectors, and in one specific example the nanoporous composite separator includes 4.5 parts boehmite to 1 part Solef 5130 by weight. In other embodiments, incorporation of a small amount of co-monomer may enhance the cohesive strength of the separator material. In some embodiments, decreasing the ratio of inorganic oxide to organic polymer will lower the porosity and cycling rate capability of the separator material while increasing its mechanical strength.

In another example embodiment, the nanoporous composite separator may have a porosity between 35-50%, a uniform pore distribution over the entire separator material, and/or an average pore diameter of between 20-40 nm. In different sets of embodiments, the porosity of the separator is between 40-45%. In other sets of embodiments, the inorganic material may include no pores greater than 100 nm, 90 nm, 80 nm, 70 nm, 60 nm, 50 nm, or 40 nm. In still other sets of embodiments, less than 1% or less than 0.1% of the pores are greater than 100 nm, 90 nm, 80 nm, 70 nm, 60 nm, 50 nm, or 40 nm. In other sets of embodiments, the average pore size is between 10-50 nm, 20-40 nm, or 25-35 nm. In still other sets of embodiments, more than 99% or 99.9% of the pores of the composite separator are between 10-90 nm, 10-50 nm, 20-40 nm, or 25-35 nm. The nanoporous composite separator may exhibit similar properties in the machine direction (along the length of the sample) as in the transverse direction (along the width of the sample) if the separator material is not oriented during manufacturing.

In contrast to the cylindrical metal cells commonly used in lithium batteries for portable computers and other applications, many of the lithium batteries for vehicles are of a flat or prismatic design. In some cases, manufacturing high energy and economical lithium batteries for vehicles or other applications may involve increasing the proportion or percentage of the volume of the electroactive material in each battery and reducing the complexity and expense of the automated equipment to fabricate the battery. In some embodiments, a lithium battery may increase the content of electroactive material by implementing thinner separator and/or metal substrate layers. Such lithium batteries may be fabricated, for example, on less complex and less expensive automated processing equipment than, for example, the winding equipment utilized for portable computer batteries. In some embodiments, automated processing equipment may be particularly adapted for making flat or prismatic batteries.

In one embodiment, a dispersion may be prepared including the inorganic material, a polymer material, and a solvent in the desired proportions. The dispersion may then be coated on a temporary carrier substrate and allowed to dry and/or cure in order to obtain the desired mechanical properties prior to removal from the substrate. Once dried and/or cured, the composite material may be removed from the substrate (or the substrate may be removed from the composite material), thus forming a nanoporous composite separator. In various embodiments, the porous separator layer may be a film with a thickness between 5-50 μm, 10-30 μm, 7-20 μm, 10-20 μm, or 15-25 μm.

Nanoporous Composite Separator Examples

Figure 2:
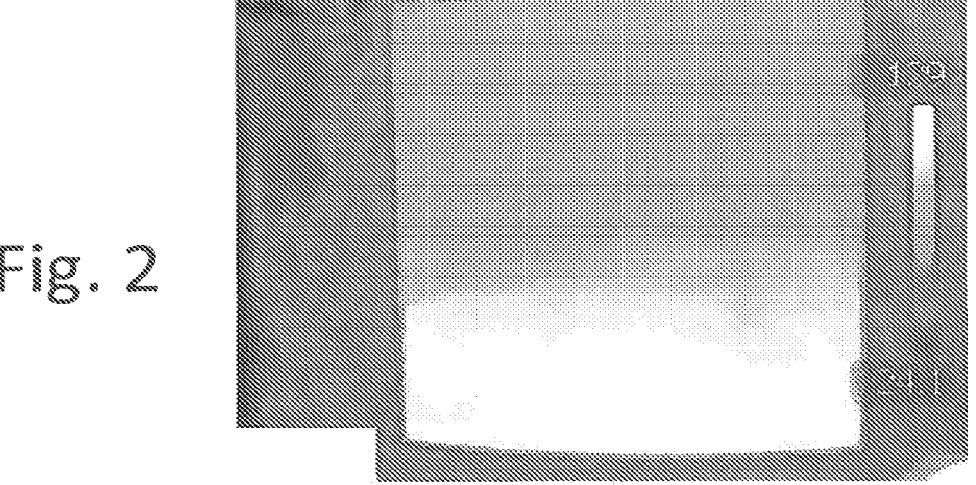

FIGS. 1-2 show thermograms produced using an infrared camera (FLIR Model 8300) of a polymeric separator and boehmite-based separator prepared according to an embodiment of the present disclosure. FIG. 1 is a thermogram of a polyethylene separator film upon exposure to a heated stainless steel substrate, while FIG. 2 is a thermogram of a boehmite-based separator film of similar thickness exposed in like manner to the heated stainless steel substrate. The bright patches 101 in FIG. 1 correspond to areas of increased heat concentration, while the darker patches 103 correspond to areas of decreased heat concentration. The uniform heat distribution observed in the boehmite-based separator of FIG. 2 is evident compared to the uneven heat distribution seen with the plastic separator.

Figure 3:
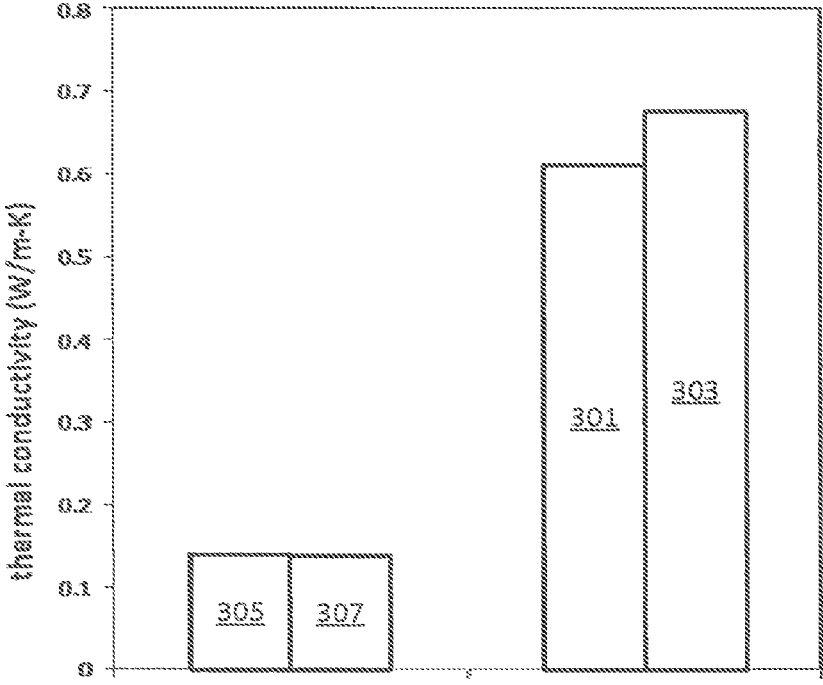
FIG. 3 shows a chart of the thermal conductivity (measured in W/m-K) of a polymeric separator compared to that of a nanoporous composite separator prepared according to an embodiment of the present disclosure.

FIG. 3 shows a chart of the thermal conductivity (measured in W/m-K) of a polymeric separator compared to that of a nanoporous composite separator prepared according to an embodiment of the present disclosure. The measurements in FIG. 3 were done according to ASTM E1461 by the laser flash (transient) method using an LFA-447 from Netzsch® Instruments, Burlington, MA These measurements illustrate the higher thermal conductivity of the nanoporous composite separator compared to a typical polyolefin separator material. Columns 301 and 303 chart the thermal conductivity of the nanoporous composite separator exposed to temperatures of 25° C. and 50° C., respectively, while columns 305 and 307 chart the thermal conductivity of the polyolefin separator material exposed to 25° C. and 50° C., respectively. In this particular embodiment, the polyolefin separator material used was 18 μm thick polyethylene, and the nanoporous composite separator was 21 μm thick and comprised a 4.5:1 ratio of Boehmite (Disperal® 10SR) to Solvay® Solef 5130. As can be seen in FIG. 3, the thermal conductivity of the nanoporous composite separator is more than four times greater than that of the polyolefin separator of a similar thickness. This enhanced thermal conductivity is further increased, in some embodiments, when the temperature is increased from 25° C. to 50° C. This property of increasing thermal conductivity as the temperature increases is particularly useful for safety in lithium ion batteries since they typically operate at temperatures around 50° C. due to the heat generated during cell operation. It is important to rapidly and evenly distribute the heat throughout the cell to minimize the localized buildup of heat from any "hot spots" or other unevenly heated areas.

Figure 4:
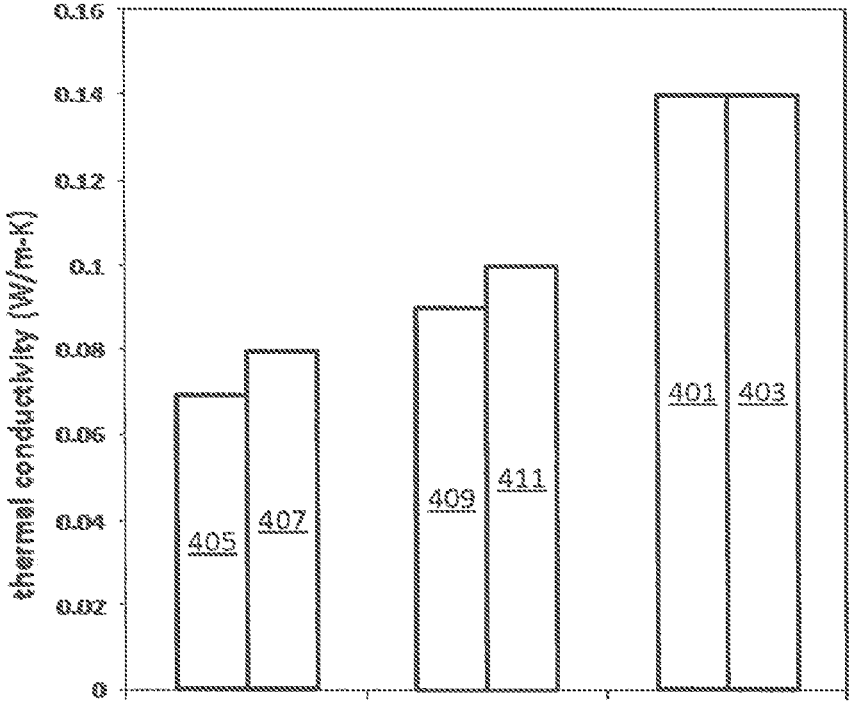
FIG. 4 shows a chart of the thermal conductivity (measured in W/m-K) of a polymeric separator material, a ceramic-coated polymeric separator material, and a nanoporous composite separator material prepared according to an embodiment of the present disclosure.

FIG. 4 shows a chart of the thermal conductivity (measured in W/m-K) of a polymeric separator material, a ceramic-coated polymeric separator material, and a nanoporous composite separator prepared according to an embodiment of the present disclosure. The thermal conductivities charted in FIG. 4 were measured according to the ASTM E1530 guarded hot plate (steady state) method with an estimated variation of +3.0%. These measurements illustrate the higher thermal conductivity of the nanoporous composite separator compared to a typical polymeric separator material and a ceramic-coated polymeric separator material. The samples measured, in this particular example, include the two separator materials measured in FIG. 3, as well as a third sample made from coating each side of the 18 μm thick polyethylene with a 3.5 μm layer comprising a 5.5:1 ratio of boehmite to polymeric binder material. Columns 401 and 403 chart the thermal conductivity of the nanoporous composite separator measured at 25° C. and 50° C., respectively; columns 405 and 407 chart the thermal conductivity of the polyolefin separator material measured at 25° C. and 50° C., respectively; and columns 409 and 411 chart the thermal conductivity of the ceramic-coated polymeric separator material measured at 25° C. and 50° C., respectively. In this particular embodiment, the thermal conductivity of the nanoporous composite separator is about twice that of the polyolefin separator material of a similar thickness, while the ceramic-coated separator material shows a slight improvement of about 20% in thermal conductivity over that of the polyolefin separator material.

Figures 5, 6:
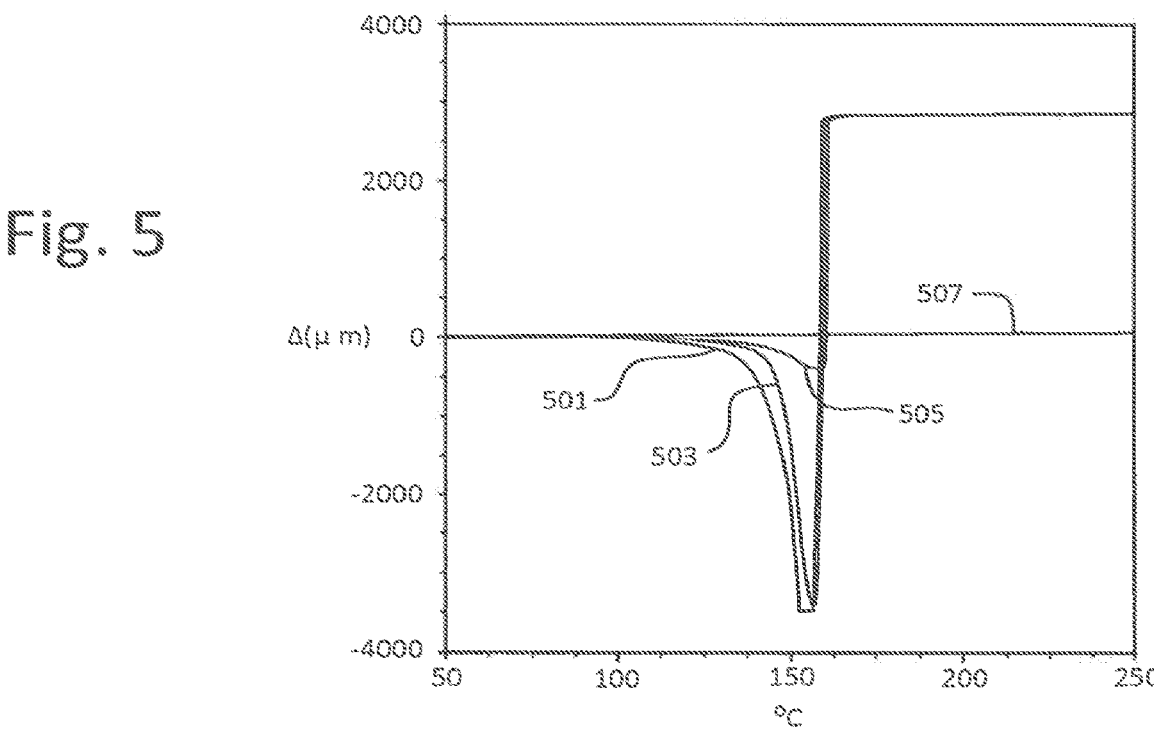
FIGS. 5-6 are graphs of the dimensional stability of various separator materials, including a nanoporous composite separator prepared according to an embodiment of the present disclosure.

FIGS. 5-6 are graphs of the dimensional stability of various separator materials, including a nanoporous composite separator prepared according to an embodiment of the present disclosure. FIG. 5 graphs the dimensional change (measured in μm) as a function of temperature of the various separator materials measured along the length of the samples, while FIG. 6 graphs the dimensional change measured along the width of the material samples. In the example embodiments shown in FIGS. 5-6, 501 graphs the dimensional change of a polymeric separator material, 503 graphs the dimensional change of a one-side ceramic-coated polymeric separator material, 505 graphs the dimensional change of a two-side ceramic-coated polymeric separator material, and 507 graphs the dimensional change of a nanoporous composite separator prepared according to an embodiment of the present disclosure. In this particular example, the polymeric separator corresponding to graph 501 was a polyethylene polyolefin with a thickness of 18 μm and a Gurley air permeability of 300 sec/100 cc. The separator corresponding to graph 503 was coated on a single side with a 3.5 μm layer comprising a 5.5:1 ratio of Boehmite (Disperal® 10SR) to Arkema Kynar® 761, and the separator had a Gurley air permeability of 470 sec/100 cc. The separator corresponding to graph 505 was coated on two sides with a 3.5 μm layer comprising a 5.5:1 ratio of Boehmite (Disperal® 10SR) to Arkema Kynar® 761, and the separator had a Gurley air permeability of 600 sec/100 cc. The nanoporous composite separator corresponding to graph 507 comprised a 4.5:1 ratio of Boehmite (Disperal® 10SR) to Solvay® Solef 5130, was 21 μm thick, had a Gurley air permeability of 900 sec/100 cc, and a porosity of 40%. As seen in FIGS. 5-6, the dimensional stability of the polymeric separator 501 and the ceramic-coated polymeric separators 503-505 changes greatly between 100-170° C., while the nanoporous composite separator 507 maintains a high dimensional stability well beyond 200° C.

Figure 7:
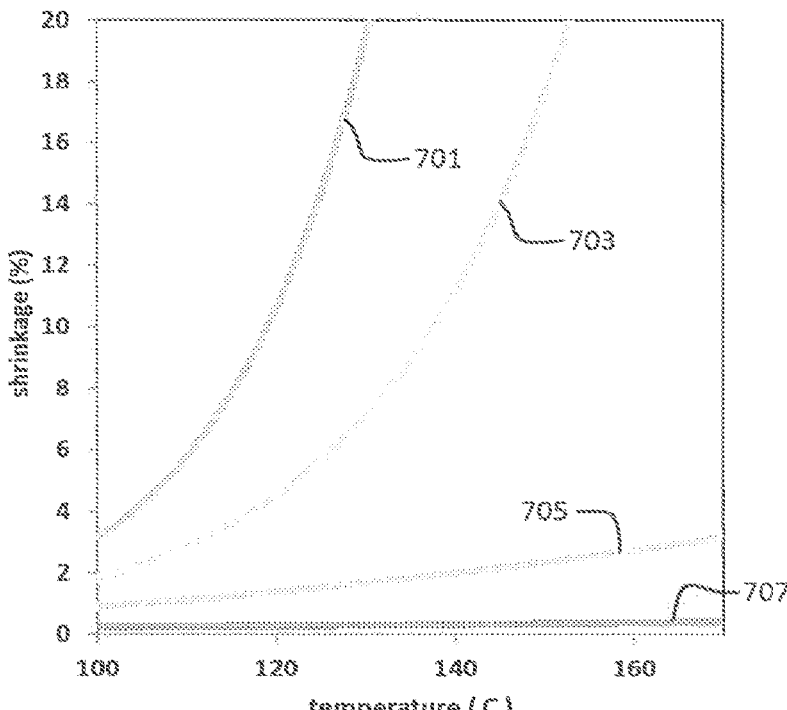
FIGS. 7-8 are graphs of the dimensional stability of various separator materials, including a nanoporous composite separator prepared according to an embodiment of the present disclosure.
Figure 8:
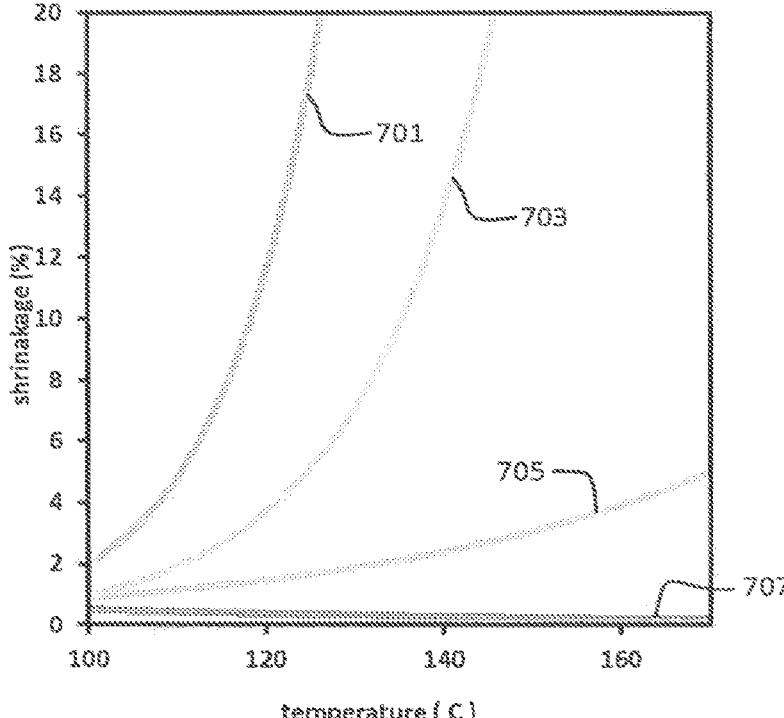

FIGS. 7-8 are graphs of the dimensional stability (measured as percent shrinkage) of various separator materials, including a nanoporous composite separator prepared according to an embodiment of the present disclosure. FIG. 7 graphs the percent shrinkage as a function of temperature of the various separator materials measured along the length of the samples, while FIG. 8 graphs the percent shrinkage measured along the width of the various material samples. The percent shrinkage graphed in FIGS. 7-8 was measured unrestrained over one hour according to the ASTM 1204 standard test method for measuring linear dimensional changes. In the example embodiments shown, 701 graphs the percent shrinkage of a polymeric separator material, 703 graphs the percent shrinkage of a one-side ceramic-coated polymeric separator material, 705 graphs the percent shrinkage of a two-side ceramic-coated polymeric separator material, and 707 graphs the percent shrinkage of a nanoporous composite separator prepared according to an embodiment of the present disclosure. In this particular embodiment, the various separators corresponding to graphs 701, 703, 705, and 707 were the same separators described above in reference to graphs 501, 503, 505, and 507, respectively. As can be seen in FIGS. 7-8, the percent shrinkage of the polymeric separator material 701 and the first ceramic-coated polymeric separator 703 increases dramatically at temperatures above 100° C. The second ceramic-coated polymeric separator material 705 experiences a less dramatic increase in percent shrinkage, while the nanoporous composite separator material 707 maintains a low percent shrinkage at or below 0.5% at temperatures above 160° C.

Figure 9:
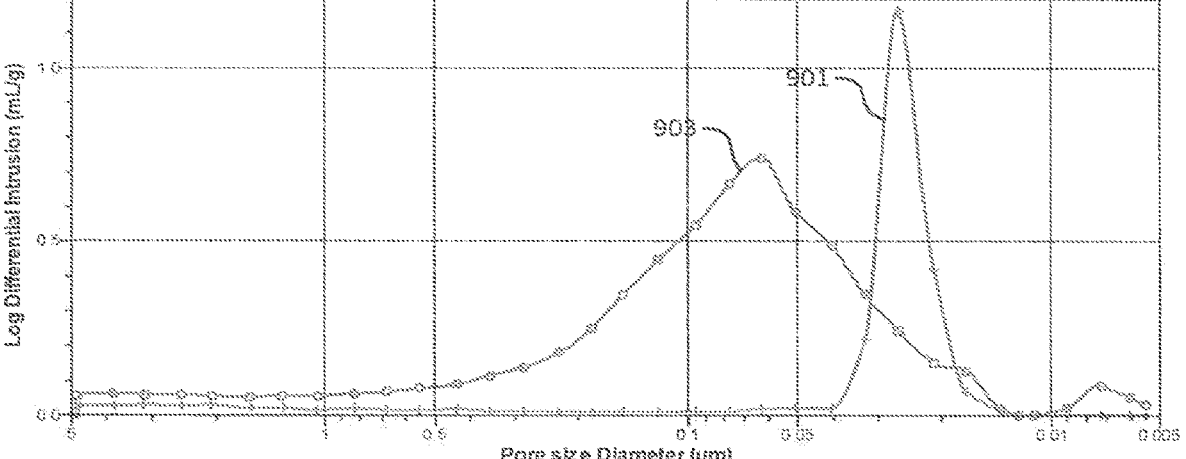
FIG. 9 is a graph of the differential intrusion as a function of pore size diameter of a polymeric separator material and a nanoporous composite separator material prepared according to an embodiment of the present disclosure.

FIG. 9 is a graph of the log of the differential intrusion (measured as mL/g) as a function of pore size diameter (measured in μm) of a polymeric separator material and a nanoporous flexible composite separator prepared according to an embodiment of the present disclosure. In this particular embodiment, 901 graphs the differential intrusion of a nanoporous composite separator 20 μm thick, with a porosity of about 40%, and comprising a 4.5:1 ratio of boehmite (Disperal® 10SR) to Solvay® Solef 5130; and 903 graphs the differential intrusion of an 18 μm thick polyethylene polymeric separator material. As can be seen in this embodiment, the pore size distribution 901 corresponding to the nanoporous composite separator is concentrated at around 30 nm, and has a smaller mean size compared to the distribution 903 corresponding to the polymeric separator. In some embodiments, such a narrow pore size distribution and small average size may minimize the risk of dendritic penetration of the separator, which may cause localized short-circuits. In other embodiments, the pore size distribution of the nanoporous composite separator may be concentrated between 10-90 nm, 10-50 nm, 20-40 nm, or 25-35 nm. The pore size may be tailored, in some embodiments, through the formulation parameters of the nanoporous composite separator. As discussed above, decreasing the ratio of inorganic oxide to organic polymer will lower the porosity and cycling rate capability while increasing the mechanical strength of the material.

Figure 10:
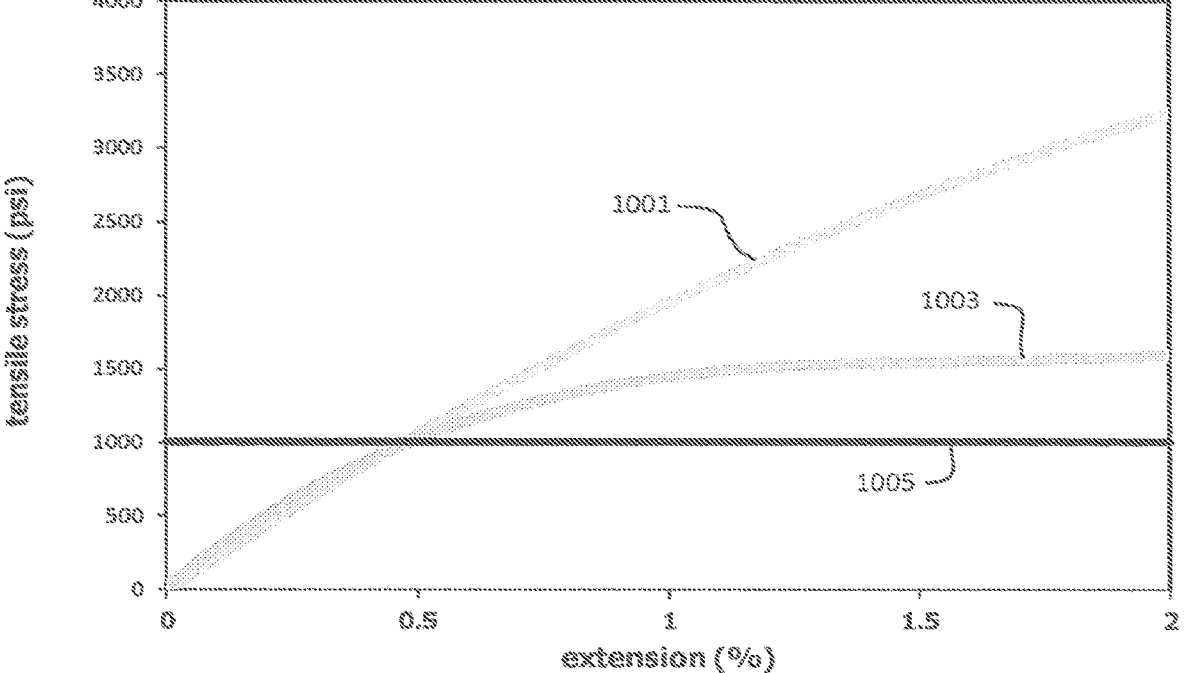
FIG. 10 is a graph of the tensile stress as a function of percent extension of two separator materials, including a nanoporous composite separator material prepared according to an embodiment of the present disclosure.

FIG. 10 is a graph of the tensile stress (measured in psi) as a function of percent extension of two separator materials, including a nanoporous composite separator prepared according to an embodiment of the present disclosure. In this example embodiment, 1001 graphs the tensile stress of a 18 μm thick polyethylene polymeric separator material; while 1003 graphs the tensile stress of a nanoporous composite separator 20 μm thick, with a porosity of about 40%, and comprising a 4.5:1 ratio of boehmite (Disperal® 10SR) to Solvay® Solef 5130. In this particular embodiment, the separators corresponding to graphs 1001, and 1003 were the same separators described above in reference to graphs 501, 503, 505, and 507, respectively. The U.S. Advanced Battery Consortium (USABC) target tensile stress is 1000 psi, and is shown by line 1005. The tensile stresses graphed in FIG. 10 were measured along the length of the material samples using the ASTM D882-00 standard method for measuring the tensile properties of thin plastic sheeting. In another embodiment, the nanoporous composite separator 1003 has more than twice the compression strength of the polymeric separator material 1001.

Figure 11:
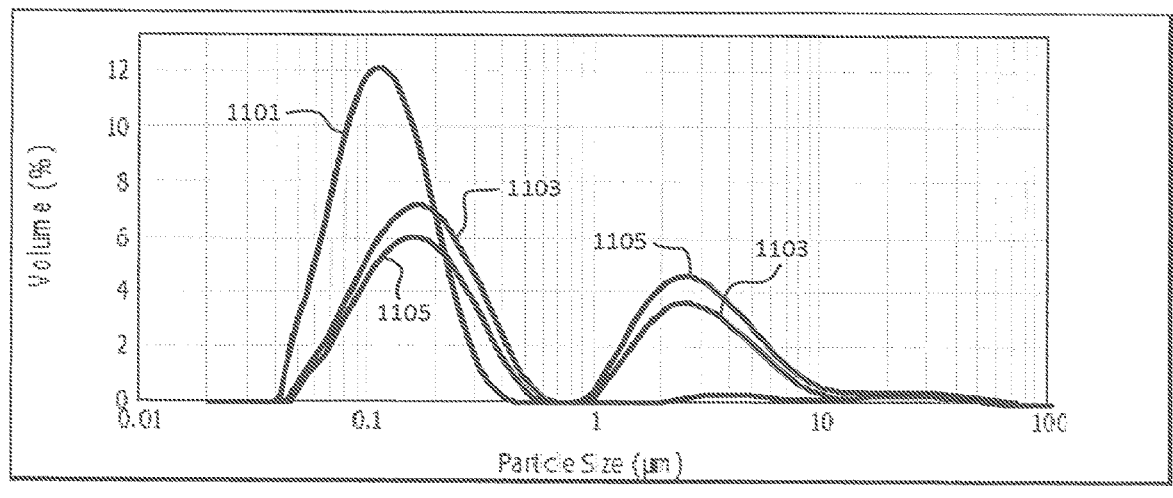
FIG. 11 is a graph of the particle size distribution of various boehmite and boron nitride (BN) blends, according to various embodiments of the present disclosure.

FIG. 11 is a graph of the particle size distribution (volume percent as a function of particle size in μm) of various boehmite and boron nitride (BN) blends, according to various embodiments of the present disclosure. In one specific example embodiment, the BN used is Saint-Gobain® Carbotherm PCTP05. As can be seen in this example, 1101 plots the particle size distribution of a 100% boehmite material, 1103 plots the particle size distribution of a composition including 90% boehmite and 10% BN, and 1105 plots the particle size distribution of a composition including 70% boehmite and 30% BN, according to three embodiments of the present disclosure. The mode of the boehmite material distribution 1101 is at about 0.1 μm. In this particular example the boehmite material distribution 1101 includes a single mode, while the 90% boehmite composition 1103 and the 70% boehmite composition 1105 each display a bimodal distribution with modes at about 0.15-0.19 μm, and at about 2-3 μm.

Figure 12:
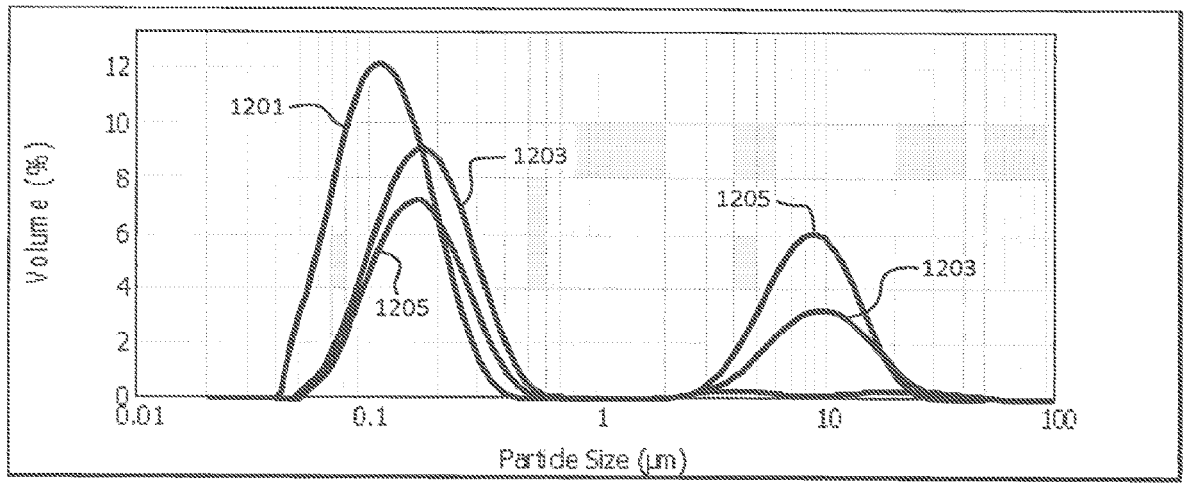
FIG. 12 is a graph of the particle size distribution of various boehmite and alumina nitride (AlN) blends, according to various embodiments of the present disclosure.

FIG. 12 is a graph of the particle size distribution (volume percent as a function of particle size in μm) of various boehmite and alumina nitride (AlN) blends, according to various embodiments of the present disclosure. As can be seen in this example, 1201 plots the particle size distribution of a separator material comprising 100% boehmite, 1203 plots the particle size distribution of a separator material comprising 90% boehmite and 10% AlN, and 1205 plots the particle size distribution of a separator material comprising 70% boehmite and 30% AlN, according to three embodiments of the present disclosure. In one embodiment, the mode of the boehmite material 1201 distribution is at about 0.1 μm, similar to the mode of the boehmite material distribution 1101 graphed in FIG. 11. In this particular example the boehmite material distribution 1201 includes a single mode, while the 90% boehmite material 1203 and the 70% boehmite material 1205 each display a bimodal distribution. The modes of the 90% boehmite material distribution 1203 are at about 0.15-0.19 μm, and at about 8-11 μm, while the modes of the 70% boehmite material distribution 1205 are at about 0.12-0.18 μm and about 7-10 μm.

In some embodiments, the inorganic particles may be of different sizes that are grouped around two, three or more modes. It is believed that by using a multi-modal distribution of particles of different sizes, the particles may be packed in a configuration in the separator that provides for increased heat transfer and better compression strength while maintaining or even improving porosity of the separator. The particles grouped around different modes may be of the same or different composition. For example, boehmite particles having a modal distribution centered at about 100 nm may be combined with additional boehmite particles having a modal distribution centered at about 2 μm. In other embodiments, boehmite particles having a modal distribution centered at about 100 nm may be combined with AlN or BN particles having a modal distribution centered at about 2 μm. The ratio of the particle size at a first mode to the particle size at a second mode can be, for example, greater than 1:2, 1:3, 1:5 or 1:10. In other embodiments, the ratio of the particle sizes of the two modes can be, for example, less than 1:100, 1:50, 1:20, 1:10, 1:5 or 1:3. The ratio (wt/wt) of the amounts of the two different sized particles used in a separator can be greater than 1:1, 2:1, 5:1 or 10:1.

Figure 13:
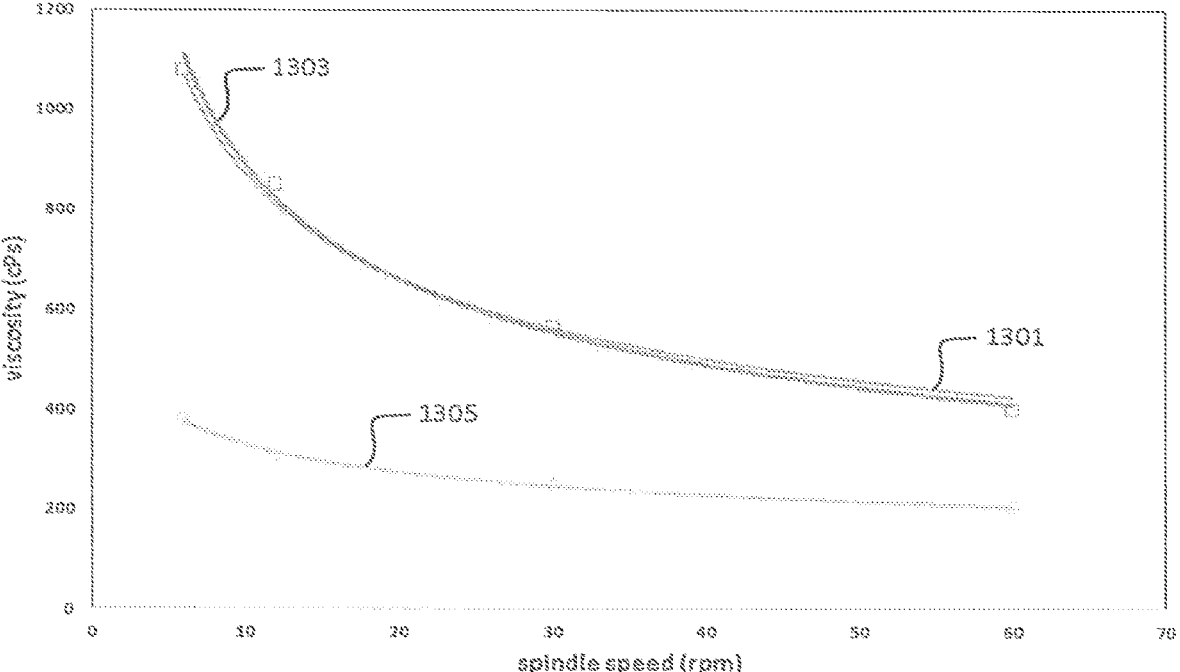
FIG. 13 is a graph of the viscosity profiles for various boehmite and BN blends, in liquid form, according to various embodiments of the present disclosure.

FIG. 13 is a graph of the viscosity profiles (measured as viscosity in cPs as a function of spindle speed in rpms) for the various boehmite and BN blends, in liquid form, according to various embodiments of the present disclosure. As can be seen in this example, 1301 plots the viscosity profile of a 100% boehmite material, 1303 plots the viscosity profile of a composition including 90% boehmite and 10% BN, and 1305 plots the viscosity profile of a composition including 70% boehmite and 30% BN, according to three embodiments of the present disclosure.

In some embodiments, the BN-modified compositions 1103-1105 and 1303-1305 may have higher thermal conductivities than a pure boehmite composition due to a dense packing of the blended filler that is enabled by the bimodal particle size distribution. Likewise, in other embodiments the AlN-modified compositions 1203-1205 may have higher thermal conductivities than a pure boehmite composition due to the bimodal particle size distribution of the AlN-modified composition.

Figure 14:
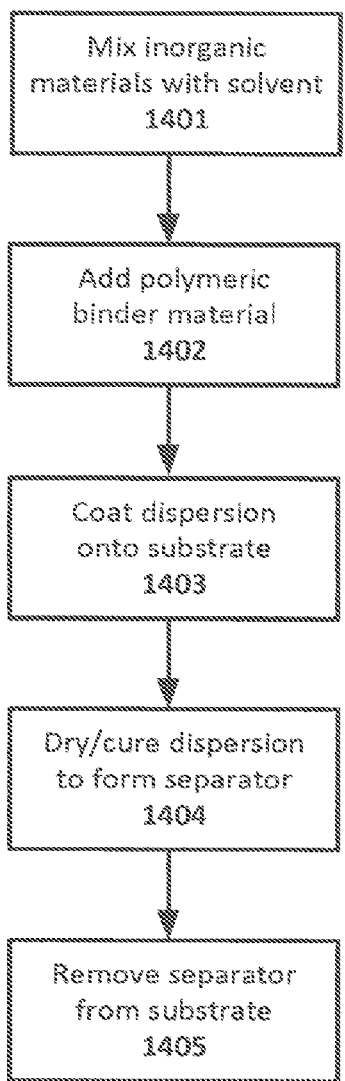
FIG. 14 is a flow chart illustrating a method for preparing a nanoporous composite separator, according to an embodiment of the present invention

FIG. 14 is a flow chart illustrating a method for preparing a nanoporous composite separator, according to an embodiment of the present invention. The method may begin by mixing 1401 inorganic particles with a solvent. In some embodiments, the inorganic particles may include $Al_2O_3$, AlO(OH) or boehmite, AlN, BN, SiN, ZnO, $ZrO_2$, $SiO_2$, or combinations thereof, and the solvent may include toluene, xylene, MEK, NMP, 2-butanone, or any other suitable solvent or combinations thereof. The method may continue with adding 1402 the polymeric binder material in order to form a dispersion. In some embodiments, the polymeric binder material may include polyvinylidene difluoride (PVdF) and copolymers thereof, polyvinyl ethers, urethanes, acrylics, cellulosics, styrene-butadiene copolymers, natural rubbers, chitosan, nitrile rubbers, silicone elastomers, PEO or PEO copolymers, polyphosphazenes, or combinations thereof. The method may continue with coating 1403 the dispersion onto a substrate and drying/curing 1404 the dispersion, thus forming the nanoporous composite separator. Once dried, the method may continue with removing 1405 the nanoporous composite separator from the substrate.

While the disclosure has been described in detail and with reference to specific and general embodiments thereof, it will be apparent to one skilled in the art that various changes and modifications can be made therein without departing from the spirit and scope thereof.

What is claimed is:

1. A porous composite battery separator, comprising:
a polymeric binder which comprises at least one of a polyvinylidene difluoride (PVdF) or a copolymer thereof; and
modified hydrated aluminum oxide particles dispersed in the polymeric binder, the modified hydrated aluminum oxide particles having a bimodal particle size distribution in a range from about 0.15 μm to about 0.19 μm and from about 2 μm to about 11 μm,
the porous composite battery separator having thermal conductivity of at least 0.6 W/m-K at 25° C. when measured by an ASTM E1461 method, and
the porous composite battery separator not comprising an additional polymeric separator layer.

2. The porous composite battery separator of claim 1 which exhibits less than 1% shrinkage when exposed to a temperature of 200° C. or 220° C. for one hour.

3. The porous composite battery separator of claim 1, wherein the thermal conductivity of the porous composite battery separator is higher at 50° C. than at 25° C.

4. The porous composite battery separator of claim 1, having an average pore size from 10 nm to 50 nm.

5. The porous composite battery separator of claim 1, having a porosity of from 35% to 50%.

6. The porous composite battery separator of claim 1, wherein the PVdF has a molecular weight of equal to or greater than 1,000,000 Da.

7. The porous composite battery separator of claim 1, wherein the copolymer is selected from the group consisting of polyvinyl ethers, urethanes, acrylics, cellulosics, styrene-butadiene copolymers, natural rubbers, chitosan, nitrile rubbers, silicone elastomers, PEO or PEO copolymers, and polyphosphazenes.

8. The porous composite battery separator of claim 1, wherein a dimensional stability of the porous composite battery separator is substantially constant at temperatures from 50° C. to 250° C.

9. The porous composite battery separator of claim 1, wherein the modified hydrated aluminum oxide particles comprise a boehmite.

10. An electrochemical cell comprising:
an anode;
a cathode;
an organic electrolyte comprising a lithium salt; and
a porous composite battery separator, comprising:
a polymeric binder which comprises at least one of a polyvinylidene difluoride (PVdF) or a copolymer thereof; and
modified hydrated aluminum oxide particles dispersed in the polymeric binder, the modified hydrated aluminum oxide particles having a bimodal particle size distribution in a range from about 0.15 μm to about 0.19 μm and from about 2 μm to about 11 μm,
the porous composite battery separator having a thermal conductivity of at least 0.6 W/m-K at 25° C. when measured by an ASTM E1461, and the porous composite battery separator not comprising an additional polymeric separator layer.

11. The electrochemical cell of claim 10 which exhibits less than 1% shrinkage when exposed to a temperature of 200° C. or 220° C. for one hour.

12. The electrochemical cell of claim 10, wherein the thermal conductivity of the porous composite battery separator is higher at 50° C. than at 25° C.

13. The electrochemical cell of claim 10, having an average pore size of 10 nm to 50 nm.

14. The electrochemical cell of claim 10, having a porosity of 35% to 50%.

15. The electrochemical cell of claim 10, wherein the PVdF has a molecular weight of equal to or greater than 1,000,000 Da.

16. The electrochemical cell of claim 10, wherein the copolymer selected from the group consisting of polyvinyl ethers, urethanes, acrylics, cellulosics, styrene-butadiene copolymers, natural rubbers, chitosan, nitrile rubbers, silicone elastomers, PEO or PEO copolymers, and polyphosphazenes.

17. The electrochemical cell of claim 10, wherein a dimensional stability of the porous composite battery separator is substantially constant at temperatures from 50° C. to 250° C.

18. The electrochemical cell of claim 10, wherein the modified hydrated aluminum oxide particles comprise a boehmite.

* * * * *